ical Abstracts, Vol. 59, col. 11488 (19), (abst. of Cresswell et al).
Chemical Abstracts, Vol. 73, Abst. No. 98954u, (1970), (abst. of East German Patent 70,886).
Shimada et al., Yakugaku Zasshi, Vol.
  pp. 221–230, (1971).

United States Patent [19]
Bruderer et al.

[11] 3,884,928
[45] May 20, 1975

[54] IMIDAZOLE DERIVATIVES
[75] Inventors: Hans Bruderer, Benken; Rudolf Ruegg, Bottmingen, both of Switzerland
[73] Assignee: Hoffmann-LaRoche Inc., Nutley, N.J.
[22] Filed: Mar. 25, 1974
[21] Appl. No.: 454,537

[30] Foreign Application Priority Data
  Apr. 5, 1973  Switzerland.......................... 4919/73

[52] U.S. Cl........... 260/295.5 R; 424/264; 424/273; 260/295 R
[51] Int. Cl....................... C07d 31/36; C07d 49/36
[58] Field of Search.......... 260/309, 295 R, 295.5 R

[56]         References Cited
          OTHER PUBLICATIONS

*Primary Examiner*—John D. Randolph
*Attorney, Agent, or Firm*—Samuel L. Welt; Bernard S. Leon; William G. Isgro

[57]         ABSTRACT

Imidazole derivatives of the formula

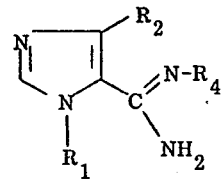

wherein $R_1$, $R_2$ and $R_4$ are as hereinafter mentioned, are described. The imidazole derivatives are useful as psychosedative and analgesic agents.

7 Claims, No Drawings

IMIDAZOLE DERIVATIVES

BRIEF SUMMARY OF INVENTION

The invention relates to imidazole derivatives of the formula

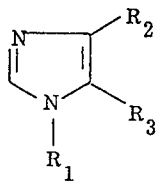

I wherein $R_1$ is lower alkyl, $R_2$ is fluorine, chlorine or bromine and $R_3$ is

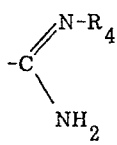

wherein $R_4$ is hydroxy, lower alkoxy, lower alkanoyloxy, lower alkoxycarbonyloxy, phenylcarbonyloxy or pyridylcarbonyloxy, and wherein phenyl and pyridyl may be substituted by lower alkyl, lower alkoxy or halogen, and salts thereof.

DETAILED DESCRIPTION OF THE INVENTION

The imidazole derivatives of the invention are characterized by the formula

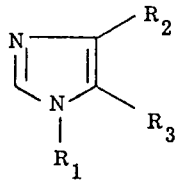

I wherein $R_1$ is lower alkyl, $R_2$ is fluorine, chlorine or bromine and $R_3$ is the group

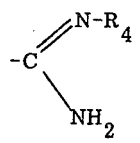

wherein $R_4$ is hydroxy, lower alkoxy, lower alkanoyloxy, lower alkoxycarbonyloxy, phenylcarbonyloxy, lower alkylphenylcarbonyloxy, lower alkoxyphenylcarbonyloxy, halophenylcarbonyloxy, pyridylcarbonyloxy, lower alkylpyridylcarbonyloxy, lower alkoxypyridylcarbonyloxy or halopyridylcarbonyloxy, and salts thereof.

The imidazole derivatives of formula I are prepared by:

a. reacting a compound of the formula

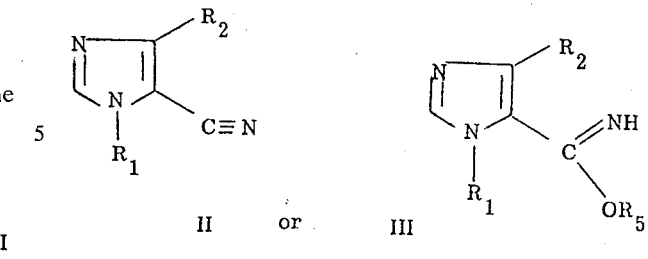

II or III wherein $R_1$ and $R_2$ are as previously described, and $R_5$ is lower alkyl, with hydroxylamine to yield an amidoxime of the formula

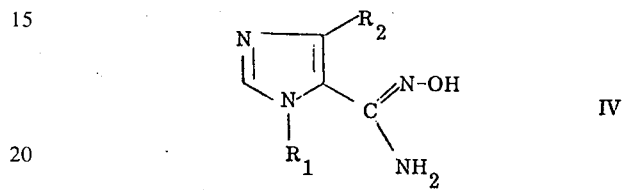

IV wherein $R_1$ and $R_2$ are previously described, or b. reacting an amidoxime of formula IV with an alkylating agent, an appropriate acylating agent or a chloroformic acid lower alkyl ester, and c. if, desired, converting a compound so obtained into a salt.

As used herein, the term "lower alkyl" denotes straight-chain and branched-chain hydrocarbon radical containing 1 to 5 carbon atoms, for example, methyl, ethyl, propyl, isopropyl, butyl, tert.-butyl, pentyl, and the like. The term "lower alkoxy" denotes an alkyl ether group in which the lower alkyl group is as described above, for example, methoxy, ethoxy, propoxy, pentoxy and the like. The term "alkanoyloxy" denotes a straight-chain and branched-chain aliphatic carboxylic acid containing 1 and 5 carbon atoms, for example, acetoxy, propionyloxy, butyryloxy and the like. The term "halogen" denotes fluorine, chlorine, bromine and iodine. The term "aryl" denotes phenyl or phenyl bearing one or more substituents selected from the group consisting of halogen, trifluoromethyl, lower alkyl, lower alkoxy, nitro, amino, lower alkylamino and di-lower alkylamino. The term "salts" includes those salts which are pharmaceutically acceptable as a consequence of their physiological properties, for example, toxicity, resorption, and the like.

Preferred compounds of formula I are those wherein $R_2$ is chlorine.

Most preferred compounds of formula I are:
4-chloro-1-methylimidazole-5-carboxamidoxime;
4-bromo-1-methylimidazole-5-carboxamidoxime;
O-acetyl-4-chloro-1-methylimidazole-5-carboxamidoxime;
4-chloro-O-ethoxycarbonyl-1-methylimidazole-5-carboxamidoxime; and
4-chloro-1-methyl-O-nicotinoylimidazole-5-carboxamidoxime.

According to process embodiment (a), an amidoxime of formula IV is prepared by reacting a compound of formula II or III with hydroxylamine. This reaction is carried out in an inert solvent, for example, a lower alkanol such as preferably, methanol or ethanol; dimethylformamide; a chlorinated hydrocarbon such as, preferably, methylene chloride or chloroform; an ether such as dioxane or diethylether; a hydrocarbon such as benzene or xylene; or dimethylsulfoxide. The reaction is advantageously carried out at a temperature in the range of between about 0°C. to about the boiling point of the reaction mixture. A preferred temperature range is from about 40°C. to about 60°C. The pressure at which the reaction is carried out is not critical. Thus, the reaction is preferably carried out in an open vessel. When a nitrile of formula II is used as the starting material, the reaction is preferably carried out with the exclusion of water because, in the presence of water, undesirable amounts of the corresponding amide are obtained as a result of side-reactions. The work-up of the reaction mixture is carried out in the usual manner by removal of the solvent and recrystallization of the residue.

According to one aspect of process embodiment (b), an amidoxime of formula IV is reacted with an alkylating agent, preferably one which bears lower alkyl group. Depending on the alkylating agent utilized, there is obtained a compound of formula I where $R_4$ is lower alkoxy. Thus, for example, when methyl iodide is used as the alkylating agent, there is obtained a compound of formula I wherein $R_4$ is methoxy. In carrying out this alkylation, it is essential to convert initially the amidoxime starting material of formula IV into an alkali metal salt or alkaline earth metal salt. For this purpose, an amidoxime of formula IV is dissolved in a lower alkanol, preferably methanol or ethanol, and the mixture is treated with an alkali metal alcoholate or alkaline earth metal alcoholate, preferably sodium methylate or sodium ethylate. The salt formation can also be advantageously carried out in dimethylformamide with the addition of an alkali metal hydride or alkaline earth metal hydride, for example, sodium hydride or the like.

A salt prepared in the manner above described is reacted in an inert organic solvent, preferably the same solvent as used for the salt formation, with an alkylating agent. As the alkylating agent, there can be used any of the usual alkylating agents which preferably have a lower alkyl group such as, for example, halides, with the exception of fluorides, lower alkylsulfonyloxy compounds, preferably mesyloxy compounds, or arylsulfonyloxy compounds, preferably tosyloxy compounds. The reaction is advantageously carried out at a temperature in the range of from about 0°C. to the boiling point of the reaction mixture, preferably at the reflux temperature. When certain lower alkylating agents such as (lower alkoxy)-(lower alkyl) halides, for example, methoxymethyl chloride, are used, the reaction is advantageously carried out at a temperature below 0°C., preferably in the range of from about −30°C. to about −50°C. The pressure at which the reaction is carried out is not critical. Thus, the reaction can be carried out in an open vessel.

According to another aspect of process embodiment (b), the acylation of an amidoxime of formula IV is carried out using a suitable functional derivative of a carboxylic acid corresponding to the acyl group denoted by $R_4$ in formula I, for example, a lower alkanecarboxylic acid such as acetic acid; or a lower arylcarboxylic acid such as benzoic acid. A suitable and reactive functional derivative of a carboxylic acid for the acylation of an amidoxime of formula IV is, for instance, an anhydride such as acetic anhydride and the like, an acid halide such as acetyl chloride, isonicotinoyl chloride hydrochloride, nicotinoyl chloride, and the like, or an imidazolide such as picolinic acid imidazolide, nicotinic acid imidazolide and the like. Of course, other reactive functional derivatives of carboxylic acids which are suitable as acylating agents can also be used.

The reaction conditions are not critical and can be readily selected from the prior art according to the carboxylic acid derivative used as the acylating agent. The reaction can be carried out, for example, at room temperature or at a temperature above or below room temperature, in each case depending on the acylating agent used. Moreover, the reaction is conveniently carried out in a conventional inert organic solvent, for example, a hydrocarbon such as benzene, toluene, or the like; a chlorinated hydrocarbon such as methylene chloride or the like; an ether such as tetrahydrofuran or the like; dimethylformamide; pyridine or the like.

According to yet another aspect of process embodiment (b), the reaction of an amidoxime of formula IV with a chloroformic acid lower alkyl ester is conveniently carried out in an inert organic solvent, for example, an ether such as dioxane or tetrahydrofuran; a chlorinated hydrocarbon such as chloroform or methylene chloride; or pyridine. The reaction is conveniently carried out at a temperature in the range of from about 0°C. to about 40°C., preferably in the range of from about 0°C. to about room temperature.

The compounds of formula I are basic or, in part, amphoteric and the preparation of their salts, especially those which are pharmaceutically acceptable, also forms part of the present invention. These salts can be prepared from the corresponding bases according to known methods in the art by treatment with suitable inorganic or organic acids. Examples of organic acids which can be utilized in the preparation of pharmaceutically acceptable addition salts are hydrochloric acid, hydrobromic acid, sulfuric acid, acetic acid, succinic acid, maleic acid, methanesulfonic acid, benzenesulfonic acid, p-toluenesulfonic acid, and the like. The pharmaceutically non-acceptable acid addition salts of the compounds of formula I are suitable as intermediates for the manufacture of corresponding pharmaceutically acceptable acid addition salts. The conversion of a pharmaceutically non-acceptable acid addition salt into a pharmaceutically acceptable acid addition salt can be carried out, for example, by salt-exchange or by liberation of the base and subsequent salt formation with a suitable pharmaceutically acceptable acid. Those compounds of formula I which are amphoteric can also optionally be converted into salts with suitable bases. Examples of pharmaceutically acceptable bases are sodium hydroxide, and the like.

The starting materials of formula II are novel compounds and can be prepared, for example, by reducing the nitro group in a compound of the formula

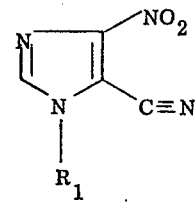

V wherein $R_1$ is as previously described, and converting the resulting compound of the formula

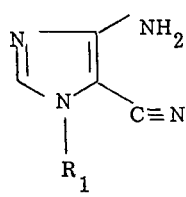

VI wherein $R_1$ is as previously described, by means of a Sandmeyer reaction into the desired compound of formula II.

The compounds of formula VI are prepared, for instance, by dissolving a compound of formula V in a lower alkanol such as methanol or ethanol, and, after the addition of a catalyst, for example, Raney nickel or palladium/carbon, reducing the mixture. The reduction is carried out at room temperature or at a slightly elevated temperature. A preferred temperature for the reduction is in the range of 20°C. and 50°C. The pressure at which the reaction is carried out is not critical.

The conversion of a compound of formula VI into a compound of formula II is carried out by means of a Sandmeyer reaction. For this purpose, a compound of formula VI is converted into a diazonium salt in a known manner. The diazonium salt is treated, also in a known manner, with an appropriate hydrohalic acid in the presence of catalytic amounts of cupric chloride, cupric bromide or cupric fluoride as may be required.

The starting materials of formula III can be prepared; for instance, by dissolving a compound of formula II in a lower alkanol such as methanol or ethanol, and, after the addition of an inert base, for example, triethylamine, the mixture is allowed to stand at room temperature. At the end of the reaction, the solvent is removed and the residue purified, conveniently by chromatography.

A compound of formula III which is obtained can be readily converted into an amidoxime of formula IV by treatment with ammonia, preferably in a closed vessel, at an elevated temperature. A preferred temperature for this treatment is in the range of from about 80°C. to about 120°C. The treatment can also be carried out at a temperature above or below this range, but the temperature should not be too high in order to prevent the possible decomposition of the reaction components.

The compounds of formula I and their pharmaceutically acceptable addition salts can be used as medicaments. More specifically, they act on the central nervous system, that is, they have psychosedative activity, also referred to as tranquilizing activity, of a special type. It has been demonstrated that they have no activity, for example, in the antipentamethylenetetrazole test, but that they show a strong activity in the rotating rod test carried out using mice. In addition, the compounds of formula I possess analgesic activity. In view of this activity profile, the compounds of formula I and their pharmaceutically acceptable salts are especially suitable for the treatment of psychic and psychosomatic disorders in the treatment of pain and associated conditions.

The acute toxicity of the compounds of formula I in the mouse varies in the range from about $LD_{50}$ 600 mg/kg. to about $LD_{50}$ 5000 mg/kg., depending upon the substituents which are present.

The activity of the compounds of formula I has been demonstrated in the "rotating rod" test and the "hot-plate" test described hereinafter.

ROTATING ROD TEST

Before beginning the test, mice are selected which can hold on to a slowly rotating rod of 30 mm. diameter, 2 revolutions per minute, for 2 minutes. The mice are given the test substance orally in various doses and the reduction in retention time is determined at 15, 30, 60, 120 and 240 minutes. The dose which causes a decrease in retention time by 50 percent at the time of maximum effect is denoted as the $HD_{50}$. In Table I, which follows, are listed $HD_{50}$ values for some representative compounds of formula I:

TABLE I

| Compound | $HD_{50}$ mg/kg. p.o. |
|---|---|
| 4-chloro-1-methylimidazole-5-carboxamidoxime | 8 |
| 4-bromo-1-methylimidazole-5-carboxamidoxime | 16 |
| O-acetyl-4-chloro-1-methyl-imidazole-5-carboxamidoxime | 15 |
| 5-chloro-O-ethoxycarbonyl-1-methylimidazole-5-carboxamidoxime | 26 |
| 4-chloro-1-methyl-O-nicotinoyl-imidazole-5-carboxamidoxime | 11 |

"HOT-PLATE" TEST

8 Male mice, weighing 22–28 g. are used per test group, 0.5 Hour after the peroral administration of the test substance, the mice are placed individually on a hot plate (60°C.) and the time in seconds which elapses between contact with the plate and when they lick their front paws is determined and recorded. Mice which are not given the test substance show a licking reaction within 10 seconds.

The number of mice which lick their front paws after 10 seconds is determined. The calculation of the $ED_{50}$ is carried out according to the Probit method. In Table II, which follows, are listed $ED_{50}$ values for some representative compounds of formula I.

TABLE II

| Compound | $ED_{50}$ mg/kg. p.o. |
|---|---|
| 4-chloro-1-methylimidazole-5-carboxamidoxime | 15 |
| 4-bromo-1-methylimidazole-5-carboxamidoxime | 22 |
| O-acetyl-4-chloro-1-methyl-imidazole-5-carboxamidoxime | 28.5 |
| 4-chloro-O-ethoxycarbonyl-1-methyl-imidazole-5-carboxamidoxime | 38 |
| 4-chloro-1-methyl-O-nicotinoyl-imidazole-5-carboxamidoxime | 60 |

In the treatment of, for example, psychic and psychosomatic disorders, the dosage of compounds of formula I is adjusted in accordance with the severity of the illness and other special requirements. In a preferred aspect, the compounds of formula I are administered in the form of tablets which can contain 10–30 mg. of active ingredient. They can be administered several times a day in daily total dosages of 10 mg. to 90 mg., preferably 30 mg. to 60 mg.

The compounds of formula I and their pharmaceutically acceptable salts can be administered as medicaments, in the form of pharmaceutical preparations which contain them, for example, in association with a compatible pharmaceutical carrier. Such carrier can be an organic or inorganic inert carrier material suitable for enteral or parenteral administration, for example, water, gelatin, lactose, starch, magnesium stearate, talc, vegetable oils, gum, polyalkyleneglycols, and the like. The pharmaceutical preparations can be made up in a solid form, for example, as tablets, dragees, suppositories or capsules, or in a liquid form, for example, as solutions, suspensions or emulsions. The pharmaceutical preparations may be sterilized and/or may contain adjuvants such as preservatives, stabilizers, wetting agents, emulsifiers, salts for varying the osmotic pressure or buffers. The pharmaceutical preparations can also contain other therapeutically valuable substances.

The following examples further illustrate the invention. All temperatures are in degrees Centigrade, unless otherwise mentioned.

EXAMPLE 1

Preparation of
4-chloro-1-methylimidazole-5-carboxamidoxime 10.5 g. of hydroxylamine hydrochloride are dissolved in 100 ml. of absolute methanol and treated at room temperature with a sodium methylate solution, which is prepared from 3.22 g. of sodium and 100 ml. of absolute methanol. The mixture is stirred for 15 minutes and the precipitated sodium chloride is removed by filtration. The hydroxylamine solution obtained is added dropwise with stirring over a period of 2 hours to a solution of 15.2 g. of 1-methyl-4-chloro-5-cyanoimidazole in 100 ml. of absolute methanol maintained at 40°C. and, subsequently, maintained at 40°C. for an additional 2 hours. After distillation of the solvent, the residue obtained is boiled with 1 liter of absolute tetrahydrofuran. The undissolved portion is separated by decantation of the solvent and the solvent is removed by distillation. After recrystallization from methanol, there is obtained 4-chloro-1-methylimidazole-5-carboxamidoxime as white crystals having a melting point of 198°–199°C.

The 1-methyl-4-chloro-5-cyanoimidazole utilized as the starting material can be prepared as follows:

After treatment with 5 g. of palladium/carbon (5 percent), a solution of 50 g. of 1-methyl-4-nitro-5-cyanoimidazole in 1 liter of absolute methanol is hydrogenated at room temperature and atmospheric pressure. Following the uptake of the theoretical amount of hydrogen, the mixture is freed from the catalyst and the solvent is removed by distillation, whereby there is obtained 1-methyl-4-amino-5-cyanoimidazole as wine-red crystals having a melting point of 175°–177° which are immediately used in the reaction hereinafter described. A sample is recrystallized from acetonitrile and melts at 178°–179°C. (yellow crystals).

A solution of 15 g. of sodium nitrite in 90 ml. of water is added dropwise with ice-cooling at 10°C. and with stirring to a solution of 25 g. of 1-methyl-4-amino-5-cyanoimidazole in 54 ml. of water, 54 ml. of concentrated hydrochloric acid and 600 ml. of glacial acetic acid. The solution obtained is added dropwise at room temperature with stirring to a mixture of 4.08 g. of copper, 11.2 g. of copper sulfate, 12.4 g. of sodium chloride, 31.8 ml. of concentrated hydrochloric acid and 20.5 ml. of water. This mixture is maintained under reflux temperature for 2 hours and is thereafter cooled. Subsequently, the mixture is stirred for an additional 0.5 hour at 60°C. and then overnight at room temperature. After distillation of the solvent, the mixture is treated with a saturated soda solution and extracted three times with 500 ml. of ethyl acetate. The organic phase is dried over magnesium sulfate and the solvent is removed by distillation. The oil obtained is taken up in benzene and rapidly purified on a 10-fold amount of aluminum oxide (activity II neutral). The benzene eluates which are uniform in a thin-layer chromatogram (silica gel plate; eluant: ethyl acetate; development: UV light) are combined and the solvent is removed by distillation. The crystalline residue obtained is used in the next reaction in a crude state. A sample of 1-methyl-4-chloro-5-cyanoimidazole crystallizes from ether as yellow crystals having a melting point of 59°–60°C.

In an analogous manner to that described above, 4-bromo-1-methylimidazole-5-carboxamidoxime as white crystals having a melting point of 198°–199°C. (recrystallized from methanol) is obtained from 1-methyl-4-bromo-5-cyanoimidazole. In the preparation of the latter compound, 48 percent hydrobromic acid is used in the diazotization in place of concentrated hydrochloric acid. The 1-methyl-4-bromo-5-cyanoimidazole crystallizes from a mixture of ethyl acetate and hexane (5:1) as white crystals having a melting point of 80°C.

EXAMPLE 2

Preparation of
O-acetyl-4-chloro-1-methylimidazole-5-carboxamidoxime

A solution of 3.35 ml. of acetyl chloride in 20 ml. of ether is added dropwise at room temperature with stirring to a solution of 8.0 g. of 1-methyl-4-chloroimidazole-5-carboxamidoxime in 160 ml. of absolute pyridine. The mixture is subsequently stirred for an additional 2 hours. After distillation of the solvent under a water-jet vacuum, the oil obtained is treated with water and extracted with ethyl acetate. The organic phase is washed with saturated sodium chloride solution, dried over magnesium sulfate and the solvent is removed by distillation. The crystalline residue obtained is recrystallized from ethyl acetate/hexane whereby there are obtained white crystals of O-acetyl-4-chloro-1-methylimidazole-5-carboxamidoxime having a melting point of 150°–151°C.

In an analogous manner to that described above there is obtained:

from 1-methyl-4-chloroimidazole-5-carboxamidoxime and nicotinic acic chloride there is obtained 4-chloro-1-methyl-O-nicotinoylimidazole-5-carboxamidoxime as white crystals (from acetonitrile) having a melting point of 152°C.;

from 1-methyl-4-chloroimdiazole-5-carboxamidoxime and isonicotinic acid chloride there is obtained 4-chloro-1-methyl-O-isonicotinoylimidazole-5-carboxamidoxime as white crystals (from methanol) having a melting point of 166°–167°C. (decomposition); and from 1-methyl-4-chloroimidazole-5-carboxamidoxime and benzoyl chloride there is obtained 4-chloro-1-methyl-O-benzoylimidazole-5-carboxamidoxime as white crystals (from acetonitrile) having a melting point of 183°–184°C. (decomposition).

EXAMPLE 3

Preparation of 4-chloro-O-ethoxycarbonyl-1-methylimidazole-5-carboxamidoxime 25 g. of 1-methyl-4-chloroimidazole-5-carboxamidoxime are dissolved in a mixture of 2 liters of absolute tetrahydrofuran and 11.5 ml. of pyridine, and treated dropwise at 0°–5°C. with a solution of 13.75 ml. of chloroformic acid ethyl ester in 50 ml. of absolute tetrahydrofuran. Subsequently, the mixture is stirred for an additional 2 hours at room temperature. After distillation of the solvent, the residue is treated with water and extracted twice with 250 ml. portions of ethyl acetate. The organic phase is washed twice with a saturated sodium chloride solution, dried over magnesium sulfate and the solvent is removed by distillation. The oil obtained crystallizes after treatment with isopropyl ether. The crystals obtained are recrystallized from ethanol and there is obtained 4-chloro-O-ethoxycarbonyl-1-methylimidazole-5-carboxamidoxime as white crystals having a melting point of 155°C. (decomposition).

EXAMPLE 4

Preparation of 1-methyl-4-chloro-O-ethylimidazole-5-carboxamidoxime

To 1.25 g. of sodium hydride (55percent) in 50 ml. of absolute dimethylformamide is added dropwise at 20°C. with stirring a solution of 5.0 g. of 1-methyl-4-chloroimidazole-5-carboxamidoxime in 50 ml. of absolute dimethylformamide. After the lapse of 15 minutes, 5 g. of ethyl iodide are added dropwise and the mixture is stirred for an additional 1 hour. Cautiously, the mixture is treated with 10 ml. of ethanol and the solvent is removed by distillation in a water-jet vacuum at 50°C. The residue obtained is treated with 1-N hydrochloric acid and extracted twice with 200 ml. of ether. The aqueous phase is made alkaline by the addition of a saturated soda solution and extracted twice with 100 ml. portions of ethyl acetate. The organic phase is washed once with 10 ml. of sodium chloride solution, dried over magnesium sulfate and the solvent is removed by distillation. The oil obtained is chromatographed on a +-fold amount of Kieselgel. After discarding the chloroform eluates, the column is eluted with ethyl acetate and the fractions which are uniform in a thin-layer chromatogram (Kieselgel plates; eluant: nitromethane; development: UV light) are combined. Thereafter, the solvent is evaporated and there are obtained 3.4 g. of a uniform oil which, after spraying with n-hexane, crystallizes to give 1-methyl-4-chloro-O-ethylimidazole-5-carboxamidoxime as white crystals having a melting point of 76°–77°C.

EXAMPLE 5

Preparation of 1-methyl-4-chloroimidazole-5-carboxamidoxime 5.6 g. of hydroxylamine hydrochloride are dissolved in 300 ml. of absolute methanol and treated at room temperature with a sodium methylate solution which is prepared from 1.72.g. of sodium and 50 ml. of absolute methanol. The mixture is stirred for 15 minutes. Then, 10.0 g. of 1-methyl-4-chloroimidazole-5-carboximide acid methyl ester are added with stirring over a period of 10 minutes and the mixture is stirred overnight at 40°C. After removal of the solvent by distillation, the crystalline residue is treated with 100 ml. of water. The separated precipitate is removed by filtration under suction and washed with water. After a single crystallization from methanol, there are obtained 3.5 g. of 1-methyl-4-chloroimidazole-5-carboxamidoxime as white crystals having a melting point of 198°–199°C.

The starting material, 1-methyl-4-chloroimidazole-5-carboximide acid methyl ester can be prepared as follows:

33.0 g. of 1-methyl-4-chloro-5-cyanoimidazole are dissolved in 1.0 liter of absolute methanol and, after treatment with 10 ml. of triethylamine, the resulting mixture is stirred for 4 days at 45°C. After removal of the solvent by distillation, the mixture obtained is chromatographed on a 30-fold amount of Kieselgel. The ethyl acetate eluates which are uniform in a thin-layer chromatogram (Kieselgel plate; eluant: nitromethane; development: UV light) are combined. Thereafter, the solvent is removed by distillation and there is obtained 1-methyl-4-chloroimidazole-5-carboximide acid methyl ester (10.5 g.) as white crystals which melt at 148°C.

The example which follows illustrates a pharmaceutical preparation containing an imidazole derivative of formula I of the invention:

Example A — Capsules

| | |
|---|---|
| (4-chloro-1-methylimidazole-5-carboxamidoxime | 30 mg. |
| Lactose | 155 mg. |
| Maize starch | 40 mg. |
| Talc | 5 mg. |
| Total | 230 mg. |

The 4-chloro-1-methylimidazole-5-carboxamidoxine is homogeneously mixed with the mannitol and the talcum. The resulting mixture is passed through a No. 5 sieve (mesh width about 0.23 mm.) and again thoroughly mixed. The mixture is filled into size No. 4 gelatin capsules.

We claim:
1. A compound of the formula

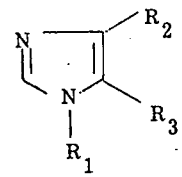

wherein $R_1$ is lower alkyl, $R_2$ is fluorine, chlorine or bromine and $R_3$ is

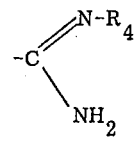

wherein $R_4$ is hydroxy, lower alkoxy, lower alkanoyloxy, lower alkoxycarbonyloxy, phenylcarbonyloxy, lower alkylphenylcarbonyloxy, lower alkoxyphenylcarbonyloxy, halophenylcarbonyloxy, pyridylcarbonyloxy, lower alkylpyridylcarbonyloxy, lower alkoxypyridylcarbonyloxy or halopyridylcarbonyloxy, or a pharmaceutically acceptable salt thereof.

2. A compound in accordance with claim 1, wherein $R_2$ is chlorine.

3. A compound in accordance with claim 1, 4-chloro-1-methylimidazole-5-carboxamidoxime.

4. A compound in accordance with claim 1, 4-bromo-1-methylimidazole-5-carboxamidoxime.

5. A compound in accordance with claim 1, O-acetyl-4-chloro-1-methylimidazole-5-carboxamidoxime.

6. A compound in accordance with claim 1, 4-chloro-O-ethoxycarbonyl-1-methylimidazole-5-carboxamidoxime.

7. A compound in accordance with claim 1, 4-chloro-1-methyl-O-nicotinoylimidazole-5-carboxamidoxime.

* * * * *